United States Patent
Jiang et al.

(10) Patent No.: US 11,985,730 B2
(45) Date of Patent: May 14, 2024

(54) TERMINAL CONFIGURATION METHOD AND APPARATUS

(71) Applicant: HUAWEI TECHNOLOGIES CO., LTD., Guangdong (CN)

(72) Inventors: Yinqing Jiang, Wuhan (CN); Haoping Guo, Wuhan (CN); Juan Wang, Wuhan (CN); Fanghui Bao, Wuhan (CN); Xiaojian Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 438 days.

(21) Appl. No.: 17/229,941

(22) Filed: Apr. 14, 2021

(65) Prior Publication Data

US 2021/0235257 A1 Jul. 29, 2021

Related U.S. Application Data

(63) Continuation of application No. PCT/CN2018/110303, filed on Oct. 15, 2018.

(51) Int. Cl.
*H04W 8/18* (2009.01)

(52) U.S. Cl.
CPC .................. *H04W 8/183* (2013.01)

(58) Field of Classification Search
CPC ...... H04M 1/675; H04W 8/183; H04W 88/02
USPC ....................................................... 455/558
See application file for complete search history.

(56) References Cited

U.S. PATENT DOCUMENTS

| | | | | |
|---|---|---|---|---|
| 9,198,228 | B2 * | 11/2015 | Wippich | H04W 88/06 |
| 9,369,938 | B2 * | 6/2016 | Biggs | H04W 12/06 |
| 10,433,156 | B1 * | 10/2019 | Long | H04W 8/205 |
| 10,959,085 | B2 * | 3/2021 | Chikkala | H04L 9/088 |

(Continued)

FOREIGN PATENT DOCUMENTS

| | | |
|---|---|---|
| CN | 104507070 A | 4/2015 |
| CN | 104584603 A | 4/2015 |

(Continued)

OTHER PUBLICATIONS

1 Extended European Search Report issued in EP18936895.4, dated Oct. 11, 2021, 10 pages.

(Continued)

*Primary Examiner* — Tan H Trinh

(57) ABSTRACT

Embodiments of this application provide a terminal configuration method and an apparatus. When determining that a SIM card in a terminal is powered on, a wireless communications module reads SIM card information such as some or all of an international mobile subscriber identity (IMSI), a service provider name (SPN), or a global identifier ID (GID) in the SIM card from the SIM card. After that, the SIM card information obtained by the wireless communications module is sent to an application processor. The application processor obtains an operator parameter based on the SIM card information reported by the wireless communications module, and configures the terminal. Therefore, at a moment at which the SIM card is powered on, the wireless communications module obtains the SIM card information from the SIM card, so that a timing for the UE to obtain the IMSI is advanced.

20 Claims, 6 Drawing Sheets

(56) References Cited

U.S. PATENT DOCUMENTS

| | | | | |
|---|---|---|---|---|
| 2009/0061934 | A1* | 3/2009 | Hauck | H04W 8/265 |
| | | | | 455/558 |
| 2013/0012266 | A1 | 1/2013 | Duan et al. | |
| 2014/0057679 | A1 | 2/2014 | Berionne et al. | |
| 2015/0078173 | A1* | 3/2015 | Javed | H04W 36/12 |
| | | | | 370/241 |
| 2015/0282209 | A1* | 10/2015 | Shao | H04L 1/1812 |
| | | | | 370/329 |
| 2015/0373530 | A1* | 12/2015 | Stein | H04W 4/60 |
| | | | | 455/411 |
| 2016/0095023 | A1 | 3/2016 | Payyappilly et al. | |
| 2016/0269890 | A1* | 9/2016 | Chong | H04L 41/082 |
| 2016/0337884 | A1* | 11/2016 | Jiao | H04W 72/23 |
| 2020/0053549 | A1 | 2/2020 | Li | |
| 2020/0053806 | A1* | 2/2020 | Han | H04W 76/15 |
| 2020/0267534 | A1* | 8/2020 | Chong | H04W 76/10 |
| 2020/0413324 | A1* | 12/2020 | Jiang | H04W 8/183 |

FOREIGN PATENT DOCUMENTS

| | | |
|---|---|---|
| CN | 104902460 A | 9/2015 |
| CN | 105578448 A | 5/2016 |
| CN | 106162591 A | 11/2016 |
| CN | 106604261 A | 4/2017 |
| CN | 106658673 A | 5/2017 |
| CN | 106686579 A | 5/2017 |
| CN | 107087070 A | 8/2017 |
| CN | 107295497 A | 10/2017 |
| CN | 107682850 A | 2/2018 |
| CN | 108495302 A | 9/2018 |
| EP | 3614654 A1 | 2/2020 |
| JP | 2016511991 A | 4/2016 |
| KR | 20180091059 A | 8/2018 |
| WO | 2016184203 A1 | 11/2016 |
| WO | 2017133374 A1 | 8/2017 |
| WO | 2018058737 A1 | 4/2018 |

OTHER PUBLICATIONS

Examination report issued in AU2018445805, dated Jul. 11, 2022, 5 pages.
Office Action issued in JP2021-546029 with English translation, dated Jul. 19, 2022, 7 pages.
Action issued KR Application No. 10-2021-7014262, with English Translation dated May 30, 2022, 8 pages.
International Search Report and Written Opinion issued in PCT/CN2018/110303, dated Jul. 12, 2019, 9 pages.
Office Action issued in CN 201880083010.2 dated Jan. 15, 2021, 8 pages.
1 Notice of Allowance issued in JP2021-546029, dated Jan. 16, 2023, 3 pages.
1 Examination Report issued in IN202117017800, dated Feb. 21, 2022, 7 pages.

* cited by examiner

TERMINAL CONFIGURATION METHOD AND APPARATUS

CROSS-REFERENCE TO RELATED APPLICATIONS

This application is a continuation of International Application No. PCT/CN2018/110303 filed on Oct. 15, 2018, the disclosure of which is hereby incorporated by reference in its entirety.

TECHNICAL FIELD

This application relates to the communications field, and in particular, to a terminal configuration method and an apparatus.

BACKGROUND

Currently, a terminal (UE) may identify an operator of a subscriber identity module (subscriber identification module, SIM) card based on SIM card information such as an IMSI stored in the SIM card in the UE, obtain an operator parameter corresponding to the operator, and configure the operator parameter. In this way, the UE can automatically configure the operator parameter to obtain a service of the operator, so that a subscriber is relieved from troublesome steps of manually configuring the operator parameter, thereby improving configuration efficiency and configuration accuracy.

However, in existing solutions in which UE reads SIM card information in a SIM card, an application processor (AP) of the UE can start reading the SIM card information only after a SIM card file is loaded. Therefore, the UE reads the SIM card information belatedly, postponing network access of the UE.

SUMMARY

Embodiments of this application provide a terminal configuration method and an apparatus, to resolve the existing technical problem that a terminal reads an IMSI in a SIM card belatedly.

According to a first non-limiting aspect of an example embodiment, a terminal configuration method is provided. The method is applied to a terminal including an application processor and a wireless communications module. In the method, upon determining that a SIM card in the terminal is powered on, the wireless communications module reads first information in the SIM card from the SIM card, and then the wireless communications module sends the first information to the application processor; and the application processor obtains an operator parameter based on the first information reported by the wireless communications module, and configures the terminal, where the first information includes some or all of an international mobile subscriber identity (IMSI), a service provider name (SPN), or a global identifier ID (GID).

In comparison with the prior art in which a wireless communications module can obtain SIM card information such as some or all of an IMSI, an SPN, or a GID in a SIM card only after an application processor starts an operator parameter configuration program, in the foregoing method, a time at which the wireless communications module obtains SIM card information can be advanced to a moment at which the SIM card is powered on; then the wireless communications module sends the SIM card information to the application processor; and the application processor determines the operator parameter based on the SIM card information. Therefore, a timing of automatically configuring the operator parameter by the terminal is advanced.

In an example embodiment, the method further includes: the application processor sends information about the operator parameter to the wireless communications module; the wireless communications module determines the operator parameter based on the information about the operator parameter; and the wireless communications module loads the operator parameter. In this way, the operator parameters obtained by the application processor and the wireless communications module can be synchronized, so as to avoid an error caused by the different operator parameters loaded by the application processor and the wireless communications module.

Further, before the wireless communications module loads the operator parameter, the wireless communications module may perform a pre-loading process, so as to avoid missing of an AT command and another message during loading of the operator parameter by the wireless communications module and avoid an error in an operator parameter loading process.

For example, the pre-loading process may include: if the wireless communications module receives a first command through an attention (AT) command channel, and the first command includes the information about the operator parameter, the wireless communications module locks the AT command channel, and buffers an AT command sent by the application processor; after loading the operator parameter, the wireless communications module may unlock the AT command channel; and/or the wireless communications module enables soft-off. In the foregoing manner, missing of the AT command and the another message can be avoided during loading of the operator parameter by the wireless communications module; and after loading the operator parameter, the wireless communications module may turn on an antenna, that is, turn radio ON to enter an on state.

Alternatively, the pre-loading process may include: the wireless communications module enters a refresh state; and after each submodule of the wireless communications module loads the operator parameter, the wireless communications module exits the refresh state.

In an example embodiment, if the first information includes the IMSI, when obtaining the operator parameter based on the IMSI, the application processor determines, based on a first mapping relationship, the operator parameter corresponding to the IMSI, where the first mapping relationship is a mapping relationship between the IMSI and the operator parameter. In this way, UE can load an operator parameter of a mobile network operator SIM card.

In an example embodiment, if the first information includes the IMSI and second information, and the second information includes the SPN and/or the GID, when obtaining the operator parameter based on the first information, the application processor determines, based on a second mapping relationship, the operator parameter that is corresponding to the IMSI of the SIM card and the second information, where the second mapping relationship is a mapping relationship between the IMSI, the second information, and the operator parameter. In this way, UE can load an operator parameter of a mobile virtual network operator SIM card.

In an example embodiment, the terminal further includes a wireless interface module. When sending the first information to the application processor, the wireless communications module may send the first information to the wireless interface module, and the wireless interface module sends the first information to the application processor.

In an example embodiment, the wireless communications module sends the first information to the application processor through a first channel, where the first channel is a dedicated transmission channel for sending the first information.

According to a second aspect, an embodiment of this application provides a terminal, including a processor and a memory, where the processor includes an application processor and a wireless communications module. The memory is configured to store one or more program instructions and data; and the processor is configured to execute the one or more program instructions in the memory to perform the following operations: when determining that a subscriber identity module (SIM) card in the terminal is powered on, the wireless communications module reads first information in the SIM card from the SIM card, and sends the first information to the application processor; and the application processor obtains an operator parameter based on the first information, where the operator parameter is used by the terminal to access a network of the operator by using the SIM card; and the first information includes some or all of an international mobile subscriber identity (IMSI), a service provider name (SPN), or a global identifier ID (GID).

In an example embodiment, the processor may further be configured to: use the application processor to send information about the operator parameter to the wireless communications module; use the wireless communications module to determine the operator parameter based on the information about the operator parameter; and use the wireless communications module to load the operator parameter.

Further, before the wireless communications module loads the operator parameter, the wireless communications module may perform a pre-loading process, so as to avoid missing of an AT command and another message during loading of the operator parameter by the wireless communications module and avoid an error in an operator parameter loading process.

In an example embodiment, if the first information includes the IMSI, when obtaining the operator parameter based on the IMSI, the application processor may determine, based on a first mapping relationship, the operator parameter corresponding to the IMSI, where the first mapping relationship is a mapping relationship between the IMSI and the operator parameter.

In an example embodiment, if the first information includes the IMSI and second information, and the second information includes the SPN and/or the GID, when obtaining the operator parameter based on the first information, the application processor may determine, based on a second mapping relationship, the operator parameter that is corresponding to the IMSI of the SIM card and the second information, where the second mapping relationship is a mapping relationship between the IMSI, the second information, and the operator parameter.

In an example embodiment, the processor may further include a wireless interface module. When sending the first information to the application processor, the wireless communications module may send the first information to the wireless interface module, and the wireless interface module sends the first information to the application processor.

In an example embodiment, the terminal may send the first information to the application processor through a first channel by using the wireless communications module, where the first channel is a dedicated transmission channel for sending the first information.

According to a third aspect, an embodiment of this application provides a terminal, configured to implement the method in any one of the first aspect or the possible implementations of the first aspect, and including corresponding function modules respectively configured to implement the steps in the foregoing method. A function may be implemented by hardware, or may be implemented by hardware by executing corresponding software. The hardware or the software includes one or more modules corresponding to the foregoing function.

In an example embodiment, the terminal may include an application processor and a wireless communications module, where the wireless communications module may be configured to: when determining that a subscriber identity module (SIM) card in the terminal is powered on, read first information from the SIM card, and send the first information to the application processor; and the application processor may be configured to obtain an operator parameter based on the first information, where the operator parameter is used by the terminal to access a network of the operator by using the SIM card.

According to a fourth aspect, an embodiment of this application provides a computer-readable storage medium, including one or more program instructions. When the one or more program instructions are run on a computer, the computer is enabled to perform the method in any one of the first aspect or the possible implementations of the first aspect.

According to a fifth aspect, an embodiment of this application provides a computer program product. When the computer program product is run on a computer, the computer is enabled to perform the method in any one of the first aspect or the possible implementations of the first aspect.

According to a sixth aspect, an embodiment of this application provides a chip. The chip may be coupled to a memory, and may be configured to execute one or more program instructions in the memory, to perform the method in any one of the first aspect in the embodiments of this application and the possible implementations of the first aspect. "Coupling" means that two components are directly or indirectly combined with each other. For example, coupling may mean an electrical connection between the two components.

For technical effects brought by the second aspect to the sixth aspect, refer to the description in the first aspect. Details are not repeated.

DESCRIPTION OF EMBODIMENTS

Figure 1:
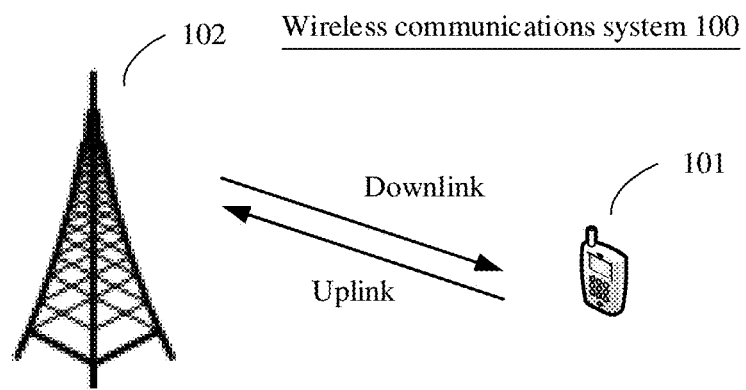
FIG. 1 is a schematic architectural diagram of a communications system to which an embodiment of this application is applicable.

An embodiment of this application provides a terminal configuration method. When determining that a SIM card is powered on, a wireless communications module of UE reads information such as some or all of an international mobile subscriber identity (international mobile subscriber identification number, IMSI), a service provider name (SPN), or a global identifier ID (GID) in the SIM card from the SIM card. After that, the wireless communications module sends the information to an application processor of the UE. The application processor obtains an operator parameter based on the some or all of the IMSI, the SPN, or the GID sent by the wireless communications module, and configures the UE. Therefore, a timing for the UE to obtain first information is advanced.

The following explains technical terms that may be used in the embodiments of this application.

An IMSI may be stored in a SIM card and can be used to uniquely identify a subscriber. Specifically, the IMSI includes a mobile country code (MCC), a mobile network code (MNC), and a mobile subscriber identification number (MSIN). The MCC includes three digits, and uniquely identifies a country to which a subscriber belongs. For example, an MCC corresponding to China is 460. The MNC is a network identifier, includes one to two digits, and can be used to identify a home network of a subscriber and an operator of the network. For example, an MNC of an operator China Mobile is 00, an MNC of an operator China Unicom is 01, and an MNC of an operator China Telecom is 03. The MSIN includes 10 to 11 digits.

SIM card: SIM cards in the embodiments of this application may be classified into a mobile network operator (MNO) SIM card, a mobile virtual network operator (MVNO) SIM card, and an embedded SIM (e-SIM) card.

The SIM card may store information such as an IMSI and an integrated circuit card identifier (integrate circuit card identity, ICCID).

The mobile network operator SIM card is a SIM card provided by a mobile network operator, where the mobile network operator such as China Mobile, China Unicom, or China Telecom may be an operator that provides a physical network for a subscriber to obtain a network service by using a SIM card. The mobile network operator SIM card is used to access a network provided by the mobile network operator, for example, an entity. The mobile network operator SIM card may access, by using the information, the network provided by the operator that provides the mobile network operator SIM card.

The mobile virtual network operator SIM card is a SIM card provided by a mobile virtual network operator. The mobile virtual network operator does not provide a physical network, and can only rent a physical network of a mobile network operator to provide a network service for a subscriber. Therefore, an MCC and an MNC of the mobile virtual network operator SIM card are the same as an MCC and an MNC of a mobile network operator SIM card. Whether a SIM card is a mobile virtual network operator SIM card or a mobile network operator SIM card can be distinguished only by using other file information in the SIM card. For example, only file information of a mobile virtual network operator SIM card includes a service provider name (SPN) used to represent a mobile virtual network operator. In addition, only card file information of a mobile virtual network operator SIM card includes a global identifier ID (group identification ID, GID), where the GID includes a global identifier level 1 (GID 1) and a global identifier level 2 (GID 2).

It should be understood that the SIM card in the embodiments of this application may alternatively be an e-SIM card, and is a SIM card built in UE. The UE can change or delete card file information in the e-SIM card. For example, the UE can erase an IMSI from or add an IMSI to the e-SIM card. If the card file information in the e-SIM card does not include an SPN or a GID, the e-SIM card may be considered as a mobile network operator SIM card in the embodiments of this application. Otherwise, if the card file information in the e-SIM card includes an SPN or a GID, the e-SIM card may be considered as a mobile virtual network operator SIM card in the embodiments of this application.

Card file information stored in the SIM card includes but is not limited to information such as some or all of an IMSI, an ICCID, an SPN, or a GID. The card file information may be stored in the SIM card as a card file, and the UE may read the card file in the SIM card to obtain the card file information. For example, the IMSI may be stored in a card file named "EF-IMSI" in the SIM card, and the ICCID may be stored in a card file named "EF-ICCID" in the SIM card, where "EF" is short for element file. The UE may read the information such as the some or all of the IMSI, the ICCID, the SPN, or the GID from the SIM card, so that the UE determines an operator parameter of an operator based on the information, to support the UE in accessing, by using the SIM card, a network provided by the operator.

The operator parameter in the embodiments of this application is an operator-related parameter that needs to be configured when the UE accesses the network provided by the operator. The operator parameter may be associated with the operator; or in other words, operator parameters of a same operator are the same. The operator parameter includes but is not limited to communication parameters of a 2G network, a 3G network, a 4G network, and a future 5G network or a future newer wireless network that are accessed by the UE, a parameter of an internet protocol (IP) multimedia subsystem (IMS), and another parameter that needs to be adapted when the terminal accesses a network.

The following describes the embodiments of this application with reference to accompanying drawings.

As shown in FIG. 1, a wireless communications system 100 provided in an embodiment of this application includes UE 101 and a base station 102. The base station 102 can support a network provided by at least one operator (for example, a network provided by any one or more operators in operator networks such as China Mobile, China Unicom, and China Telecom). The UE 101 may communicate with the base station 102 by using the network provided by the operator.

The wireless communications system 100 may be a new radio (NR) system, a global system for mobile communications (GSM) system, a code division multiple access (CDMA) system, a wideband code division multiple access (WCDMA) system, a general packet radio service (GPRS) system, a long term evolution (LTE) system, an advanced long term evolution (LTE-A) system, an evolved long term evolution (eLTE) system, a future 5G communications system, or another communications system. Specifically, a communications standard used by the wireless communications system 100 in this embodiment of this application for wireless communication is not limited herein.

Figure 2:
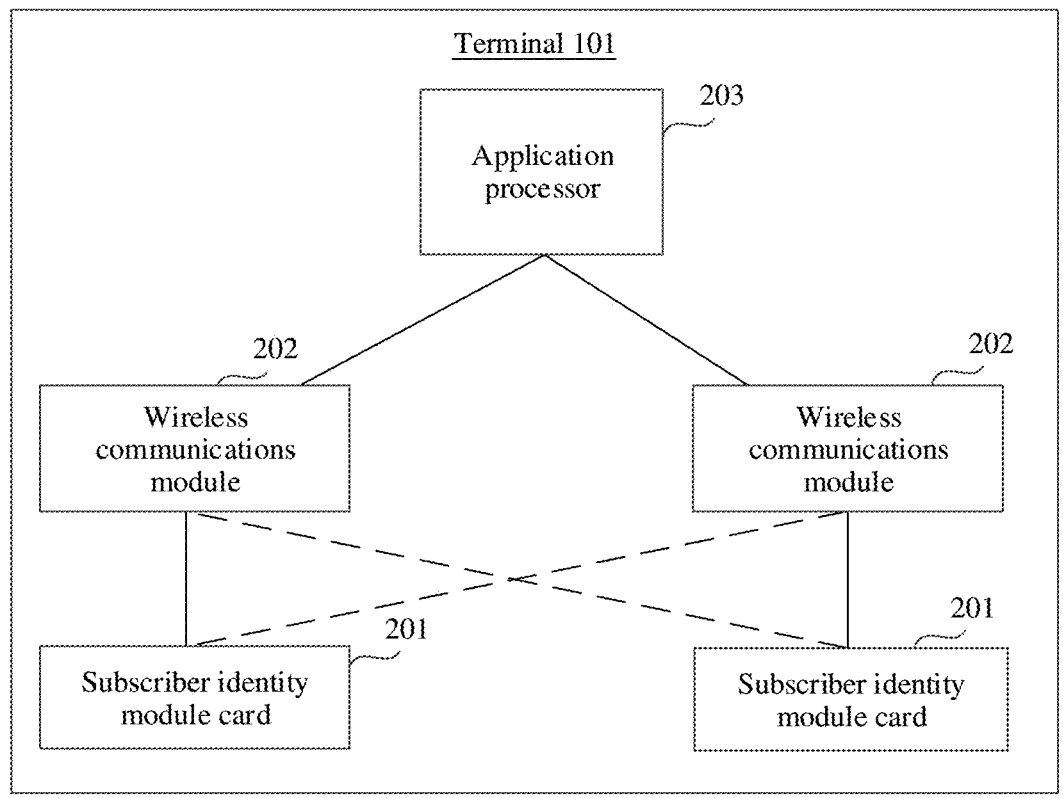
FIG. 2 is a schematic structural diagram of a terminal according to an embodiment of this application.
Figure 3:
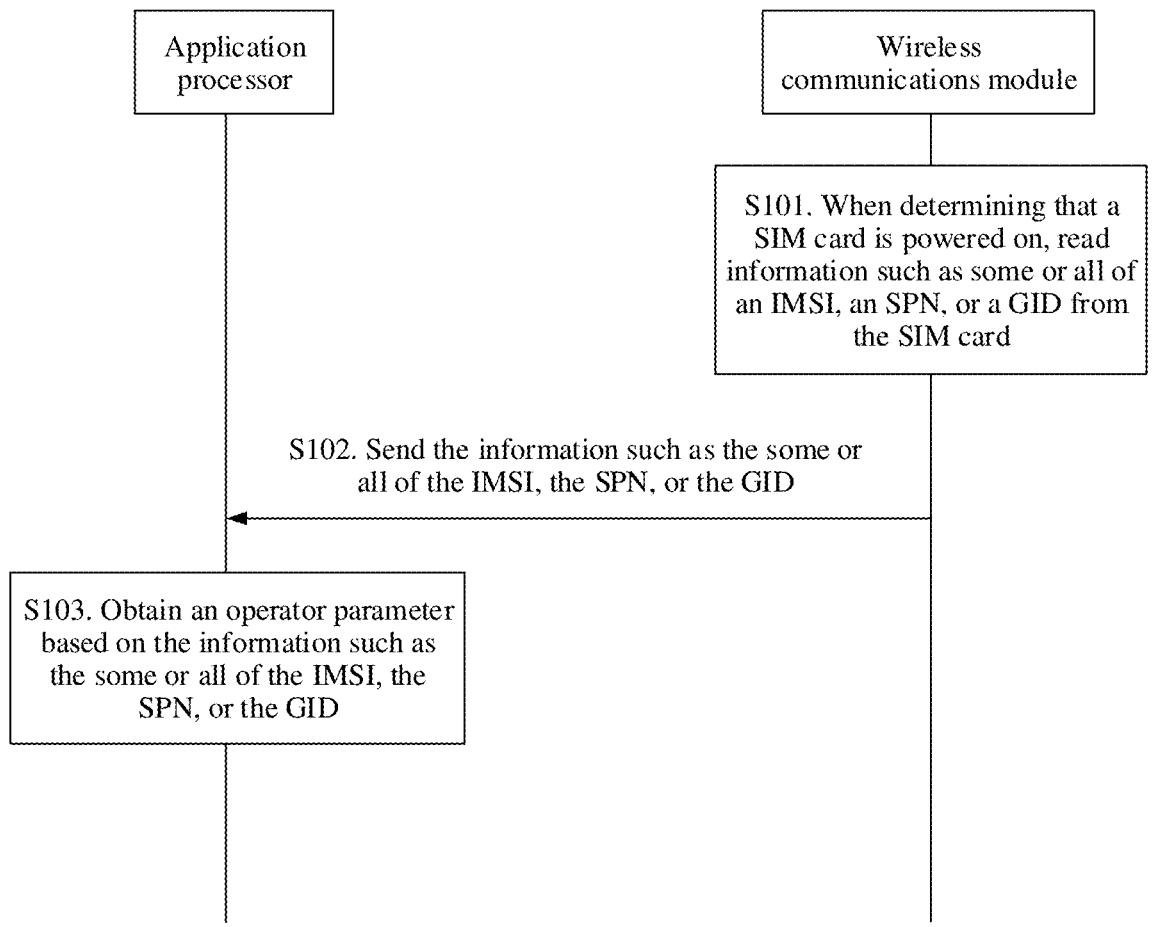
FIG. 3 is a schematic flowchart of a terminal configuration method according to an embodiment of this application.

As shown in FIG. 2, the UE 101 can support at least one SIM card 201, where the SIM card stores card file information that supports the UE 101 in accessing a network provided by an operator. When communicating with the base station 102, the UE 101 attaches the at least one SIM card 201 to a cell served by the base station 102, and communicates with the base station 102 by using the SIM card 201. For example, the SIM card 201 is a SIM card provided by an operator China Mobile; the base station 102 supports a network provided by the operator China Mobile; and the UE 101 may attach the SIM card 201 to the cell served by the base station 102, and perform wireless communication by using the cell.

Specifically, the UE 101 further includes wireless communications modules 202. Each wireless communications module 202 may be corresponding to one or more SIM cards 201. Each wireless communications module 202 may include a modem. The UE 101 may search for a network by using the wireless communications module 202, and can implement communication between the SIM card 201 and the base station 102 by using the wireless communications module 202. Wireless access technologies supported by the modem include but are not limited to GSM, WCDMA, LTE, and NR.

The UE 102 may further include an application processor 203, and the application processor 203 may be configured to process a networking requirement of an application program. Specifically, when performing communication by using the SIM card 201, the application processor 203 sends to-be-transmitted communication data to the wireless communications module 202, so as to transmit the communication data by using the wireless communications module 202.

It should be understood that functions of the application processor 203 and the wireless communications module 202 in the UE 101 may be implemented by software, hardware, or a combination of software and hardware.

It should be understood that a plurality of SIM cards 201 shown in FIG. 2 can implement wireless communication by using a same wireless communications module 202, and the plurality of SIM cards 201 can implement wireless communication with each other by using different wireless communications modules 202.

For example, the UE 101 shown in FIG. 2 can implement, by using the application processor 203 and the wireless communications module 202, a terminal configuration method provided in an embodiment of this application. The method may specifically include the following steps.

S101. When determining that a SIM card is powered on, the wireless communications module 202 reads information such as some or all of an IMSI, an SPN, or a GID from the SIM card.

S102. The wireless communications module 202 sends the IMSI to the application processor 202.

S103. The application processor 203 obtains an operator parameter based on the IMSI, where the operator parameter is used by the UE 101 to access a network of an operator by using the SIM card.

According to the foregoing method, when the SIM card is powered on, the wireless communications module 202 may read the IMSI, the SPN, and/or the GID in the SIM card from the SIM card; then the wireless communications module 202 may report the IMSI, the SPN, and/or the GID to the application processor 203 of the UE, and the application processor 203 may obtain an operator parameter based on the IMSI, the SPN, and/or the GID reported by the wireless communications module 202, and perform configuration. In comparison with the prior art, a time at which the application processor 203 obtains the operator parameter may be advanced to a moment at which the SIM card is ready, so as to shorten a time for which the UE 101 accesses the network.

It should be understood that, that the SIM card is powered on may also be referred to as that the SIM card is supplied with power, which means that the SIM card is supplied with power when the SIM card is loaded into a SIM card slot or when the UE is powered on and started. After the SIM card is powered on, a SIM card initialization program is executed. After SIM card initialization is completed (ready), a SIM card file is loaded. After the file is loaded, a state of the SIM card changes to a loaded state.

During implementation of S101, the wireless communications module 202 may read the SPN or the GID from the SIM card. Specifically, the wireless communications module 202 may determine whether an SPN is stored in the SIM card. If an SPN is stored in the SIM card, the wireless communications module 202 may read SIM from the SIM card, and send the SIM to the application processor 203. In addition, the wireless communications module 202 may alternatively determine whether a GID is stored in the SIM card. If a GID is stored in the SIM card, the wireless communications module 202 may read the GID from the SIM card, and send the GID to the application processor 203. For example, the wireless communications module 202 may alternatively send the SPN and the GID that are stored in the SIM card to the application processor 203.

During the implementation of step S101, the wireless communications module 202 may read, from the SIM card, a card file with a file name "EF-ICCID (used to store an ICCID)", "EF-IMSI (used to store an IMSI)", "EF-AD (used to store SIM card package (AD))", "EF-GID1 (used to store a GID 1)", "EF-GID2 (used to store a GID 2)", "EF-SST (used to store a SIM card service table (SIM service table))", "EF-SPN (used to store an SPN)", "EF-SPN_CPHS (used to store an SPN)", "EF-SPN_CPHS_SHORT (used to store an SPN)", or "EF-O2_SP", or a plurality of files with the foregoing card file names, to obtain card file information in the card file/card files, so as to implement quick reading of the foregoing card file/card files.

During implementation of S102, the wireless communications module 202 may send the IMSI, the SPN, and the GID to a radio interface layer (RIL) for temporary storage. The RIL may be configured to store a message and signaling that are sent by the wireless communications module 202, and may be configured to send, to the application processor 203, the message and the signaling that are sent by the wireless communications module 202. The wireless communications module 202 may alternatively send, to the RIL, the SPN and/or the GID read from the SIM card, and the RIL sends the SPN and/or the GID to the application processor 203. It should be understood that a function of the RIL may be implemented by software.

When sending first information, the wireless communications module 202 may send the first information to the application processor 203 through a first channel, where the first channel is a dedicated transmission channel for sending the first information. Specifically, the wireless communications module 202 may send the first information to the RIL through a dedicated transmission channel, and the RIL may send the first information to the application processor 203 through a dedicated transmission channel.

In an example embodiment, the application processor 203 may determine, based on a first correspondence, the operator parameter corresponding to the IMSI. If the application processor 203 can determine that the unique operator parameter is corresponding to the IMSI reported by the wireless communications module 202, it indicates that the SIM card is a mobile network operator SIM card. In this case, the application processor 203 may configure the UE 101 based on the operator parameter.

If the application processor 203 determines, based on the first correspondence, that a plurality of operator parameters are corresponding to the IMSI reported by the wireless communications module 202, it indicates that the SIM card is a mobile virtual network operator SIM card. In this case, the application processor 203 further needs to obtain the SPN or the GID from the SIM card to determine a unique operator parameter and perform configuration.

For example, the UE may store the first correspondence between the IMSI in the SIM card and the operator parameter, so that the AP determines the corresponding operator parameter based on the IMSI sent by a modem. The first correspondence may be represented as a correspondence between an MCC and an MNC in the IMSI and an identifier (operator key) of the operator parameter. Specifically, the MCC and the MNC may be used as an operator key of an operator. For example, when a country in which the operator is located is China, and the MNC of the operator is 00, 46000 can be used as the operator key of the operator.

Specifically, the identifier of the operator parameter is an identifier of an operator. The operator key is associated with the operator parameter of the operator. After determining the operator key, the UE may search for the operator parameter based on the operator key, to configure the operator parameter. For example, the operator key may be associated with a configuration file including the operator parameter, and the AP may search for the configuration file based on the operator key, and obtain the operator parameter from the configuration file. An association relationship between the operator key and the configuration file, and the configuration file may be configured in the UE 101 in advance.

The UE may store a first correspondence table shown in Table 1, and the AP may look up in Table 1 based on the IMSI, so as to determine an operator parameter corresponding to the IMSI, where the IMSI herein may be an IMSI of a mobile network operator SIM card.

TABLE 1

First correspondence table

| MCC and MNC in an international mobile subscriber identity | | Identifier of an operator |
|---|---|---|
| MCC | MNC | parameter |
| 460 | 00 | 460000 |
| 460 | 02 | 460002 |
| 262 | 02 | 26202 |
| 262 | 02 | 26202F01 |
| 262 | 02 | 26202F02 |

As shown in Table 2, if in an IMSI, an MCC is 262, and an MNC is 02, identifiers of operator parameters determined by the application processor 203 based on the IMSI are 26202F01 and 26202F02, and matching results are not unique. In this case, the application processor 203 determines that the SIM card is a mobile virtual network operator SIM card, the application processor 203 may receive the SPN and/or the GID sent by the RIL, and determine, based on a second mapping relationship, an operator parameter corresponding to the IMSI, the SPN, and/or the GID.

Specifically, the UE 101 may store the second correspondence between an SPN and/or a GID and an IMSI in the SIM card, and an operator parameter, so that the application processor 203 determines an operator parameter of an operator corresponding to the mobile virtual network operator SIM card.

The second correspondence may be a correspondence between an MCC and an MNC in an IMSI, an SPN, and an identifier of an operator parameter, or the second correspondence may be a correspondence between an MCC and an MNC in an IMSI, a GID, and an identifier of an operator parameter; or the second correspondence may be a correspondence between an MCC and an MNC in an IMSI, an SPN, a GID, and an identifier of an operator parameter.

If the SIM card is a mobile virtual network operator SIM card, an MCC and an MNC in the SIM card, a letter "F", a digit m, and a digit n may be used as an operator key of an operator associated with the mobile virtual network operator SIM card, where m and n are integers. A value of m or a value of n varies with the operator key. For example, as shown in Table 2, for a mobile virtual network operator SIM card 1, if MCC=262, MNC=02, and a value of an SPN is "voda.*", an operator key of an operator associated with the SIM card 1 may be set to "26202F01"; and for another mobile virtual network operator SIM card, that is, a mobile virtual network operator SIM card 2, if MCC=262, MNC=02, and a value of a GID is "gid1:11 gid1_mask:FF", an operator key of an operator associated with the mobile virtual network operator SIM card 2 may be set to "26202F02", so as to distinguish the operators of the mobile virtual network operator SIM card 1 and the mobile virtual network operator SIM card 2.

TABLE 2

Second correspondence table

| MCC and MNC in an international mobile subscriber identity | | | | Identifier of an operator |
|---|---|---|---|---|
| MCC | MNC | SPN | GID | parameter |
| 262 | 02 | voda.* |  | 26202F01 |
| 262 | 02 |  | gid1:11 gid1_mask:FF | 26202F02 |

It should be understood that the first correspondence table shown in Table 1 and the second correspondence table shown in Table 2 provide merely examples of the first correspondence and the second correspondence stored by the UE 101. The UE 101 may further store a third correspondence table shown in Table 3. It can be seen that, the third correspondence table includes a first correspondence and a second correspondence.

TABLE 3

Third correspondence table
Second correspondence

| | | First correspondence | | |
|---|---|---|---|---|
| | | MCC and MNC in an international mobile subscriber identity | | Identifier of an operator |
| SPN | GID | MCC | MNC | parameter |
|  |  | 460 | 00 | 460000 |
|  |  | 460 | 02 | 460002 |
|  |  | 262 | 02 | 26202 |
| voda.* |  | 262 | 02 | 26202F01 |
|  | gid1:11 gid1_mask:FF | 262 | 02 | 26202F02 |

For a use manner of the third correspondence table shown in Table 3, refer to the use manners of Table 1 and Table 2.

The application processor 203 obtains the operator parameter according to step S103, and the application processor 203 may further send the operator parameter to the wireless communications module 202, so that the wireless communications module 202 implements operator parameter synchronization. This avoids asynchronization caused when the application processor 203 and the wireless communications module 202 each obtains an operator parameter.

Specifically, the application processor 203 may send information about the operator parameter to the RIL, and the RIL sends the information about the operator parameter to the wireless communications module 202. The wireless communications module 202 may determine the operator parameter based on the information that is about the operator parameter and that is sent by the RIL, and configure the operator parameter. The information about the operator parameter may include an operator key or include an operator key and an identifier (such as an MNC) of an operator. A configuration file may be found based on the operator key or the operator key and the identifier of the operator, and the operator parameter may be obtained from the configuration file.

Figure 4:
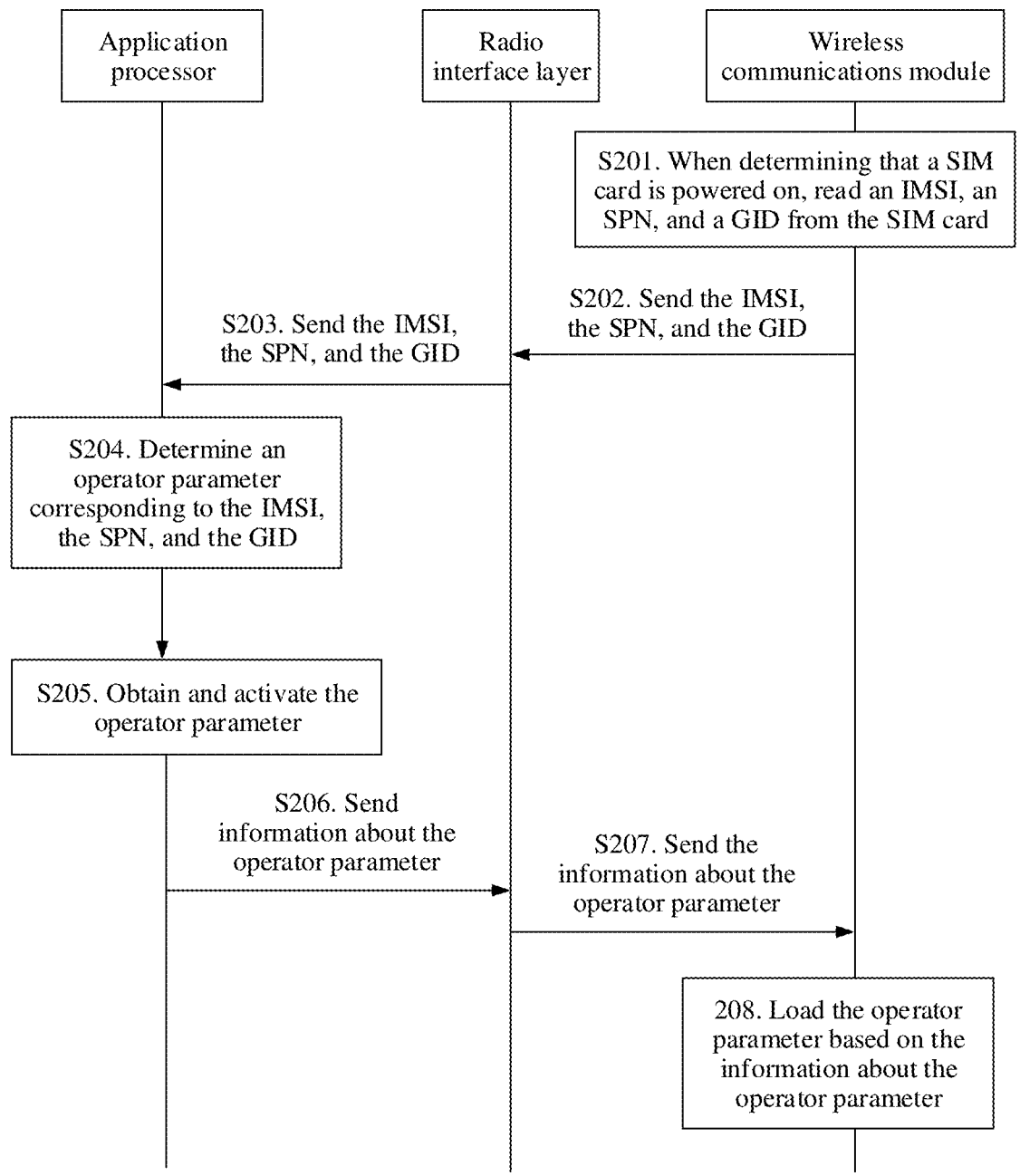
FIG. 4 is a schematic flowchart of another terminal configuration method according to an embodiment of this application.

The UE 101 shown in FIG. 2 is still used as an example. A procedure of a terminal configuration method provided in an embodiment of this application is described with reference to FIG. 4. It can be seen that the procedure specifically includes the following steps.

S201. When determining that a SIM card is powered on, the wireless communications module 202 reads an IMSI, an SPN, and a GID from the SIM card. During implementation, if the SIM card does not include the SPN or the GID, the wireless communications module 202 reads only the IMSI from the SIM card.

S202. The wireless communications module 202 sends the IMSI, the SPN, and the GID to an RIL. During implementation, if the SIM card does not include the SPN or the GID, the wireless communications module 202 sends the IMSI to the RIL.

S203. The RIL sends the IMSI, the SPN, and the GID to the application processor 203. During implementation, if the wireless communications module 202 sends only the IMSI to the RIL, the RIL sends the IMSI to the application processor 203.

S204. The application processor 203 determines an operator parameter corresponding to the IMSI, the SPN, and the GID. During implementation, the application processor 203 may determine, based on a second correspondence, the operator parameter corresponding to the IMSI, the SPN, and the GID. If the RIL sends only the IMSI to the application processor 203, the application processor 203 determines, based on a first mapping relationship, an operator parameter corresponding to the IMSI.

S205. The application processor 203 obtains and activates the operator parameter.

S206. The application processor 203 sends information about the operator parameter to the RIL, where the information about the operator parameter may be information such as an identifier of the operator parameter, an identifier of the operator parameter and an identifier of an operator, or a file path and a name of the operator parameter.

S207. The RIL sends the information about the operator parameter to the wireless communications module 202.

S208. The wireless communications module 202 loads the operator parameter based on the information that is about the operator parameter and that is sent by the application processor 203. In this way, the loaded operator parameter is indicated to the wireless communications module 202, so as to implement operator parameter synchronization between the application processor 203 and the wireless communications module 202.

During execution of step S208, the wireless communications module may perform a pre-loading process before loading the operator parameter.

Specifically, the pre-loading process may include: if the wireless communications module 202 receives a first command through an attention (AT) command channel, and the first command includes the information about the operator parameter, the wireless communications module 202 locks the AT command channel, and buffers an AT command sent by the application processor 203; after loading the operator parameter, the wireless communications module 202 may unlock the AT command channel; and/or the wireless communications module 202 turns off a central antenna (radio OFF) to enable soft-off. In the foregoing manner, missing of the AT command and another message can be avoided during loading of the operator parameter by the wireless communications module 202; and after loading the operator parameter, the wireless communications module 202 may turn on the antenna (radio ON) to enter an on state.

In addition, the pre-loading process may alternatively include: the wireless communications module 202 enters a refresh state after receiving the information about the operator parameter from the application processor 203; then the wireless communications module 202 may load the operator parameter onto each submodule of the wireless communications module 202; and the wireless communications module 202 ends the refresh state after loading the operator parameter.

During execution of step S208, after loading the operator parameter, the wireless communications module 202 may further feed back a result of the loading the operator parameter to the RIL.

Figure 5:
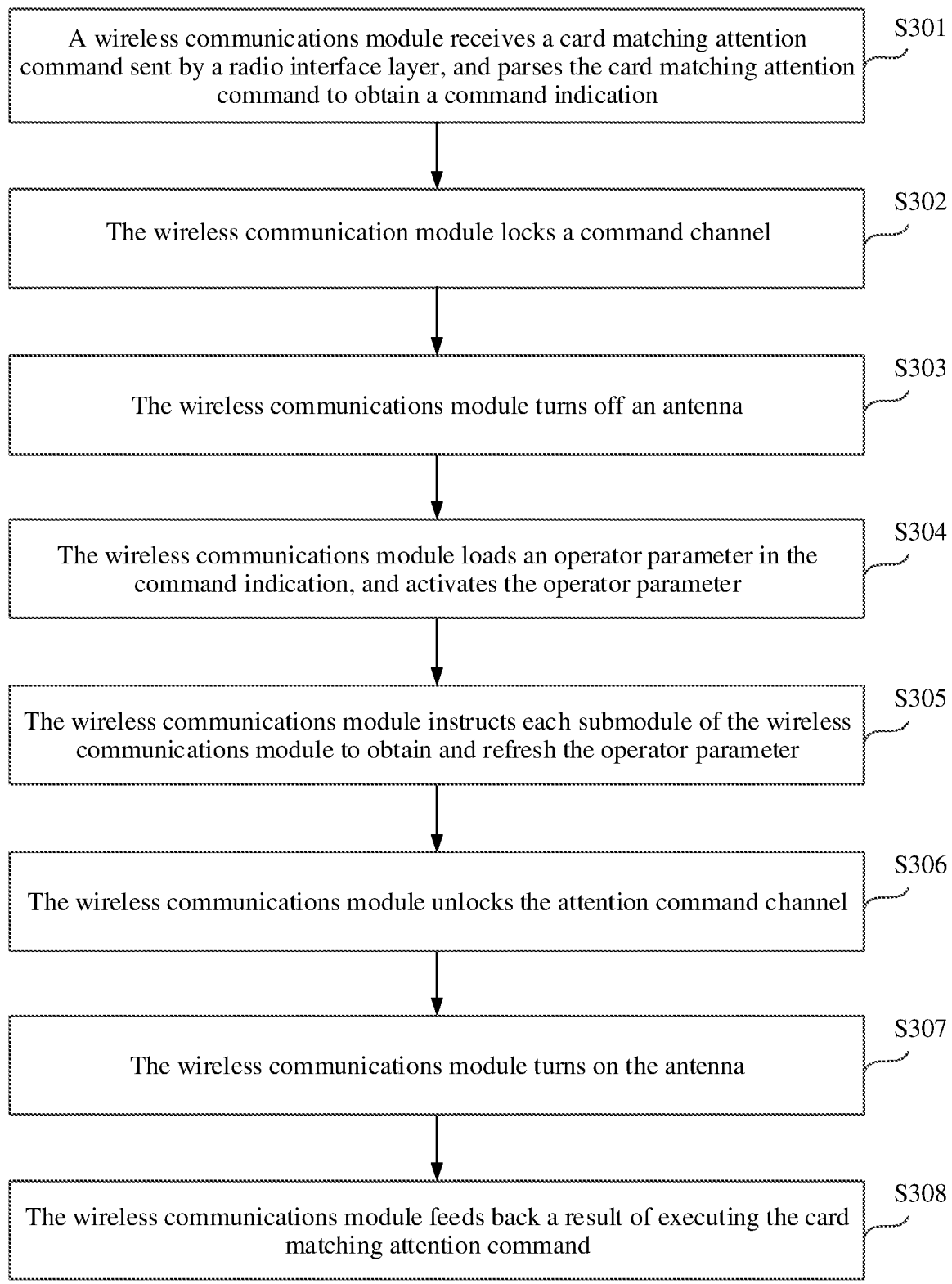
FIG. 5 is a schematic flowchart of another terminal configuration method according to an embodiment of this application.

For example, in step S208, the application processor 203 may send a card matching attention (AT) command to the wireless communications module 202 by using the RIL, to instruct the wireless communications module 202 to load the operator parameter. Specifically, the wireless communications module 202 may load the operator parameter according to the instruction of the application processor 203 and the following steps shown in FIG. 5.

S301. After receiving the card matching AT command sent by the RIL, the wireless communications module 202 parses the card matching AT command to obtain a command indication, where the command indication may include the information about the operator parameter, such as a file path and a name of the operator parameter. The command indication may further include information instructing the wireless communications module to perform activation or deactivation.

S302. The wireless communications module 202 locks an AT command channel, and buffers an AT command on the application processor 203 side; the wireless communications module 202 skips processing the AT command in this period, where the AT command channel is a transmission channel of the AT command; and the application processor 203 sends the AT command to the wireless communications module 202 through the AT command channel.

S303. The wireless communications module 202 turns radio OFF to enter a soft-off state.

S304. The wireless communications module 202 loads an operator parameter indicated by a parameter 2 in the command indication, and activates the operator parameter.

S305. The wireless communications module 202 instructs each submodule of the wireless communications module 202 to obtain and refresh the operator parameter.

S306. The wireless communications module 202 unlocks the AT command channel.

S307. The wireless communications module 202 turns radio ON to enter an on state.

S308. The wireless communications module 202 sends a result of executing the card matching AT command to the RIL, where the execution result may indicate the result of executing the card matching AT command by the wireless communications module 202. The RIL may send the result to the application processor 203. It should be understood that the method provided in this embodiment of this application may be implemented by software, hardware, or a combination of software and hardware.

Figure 6:
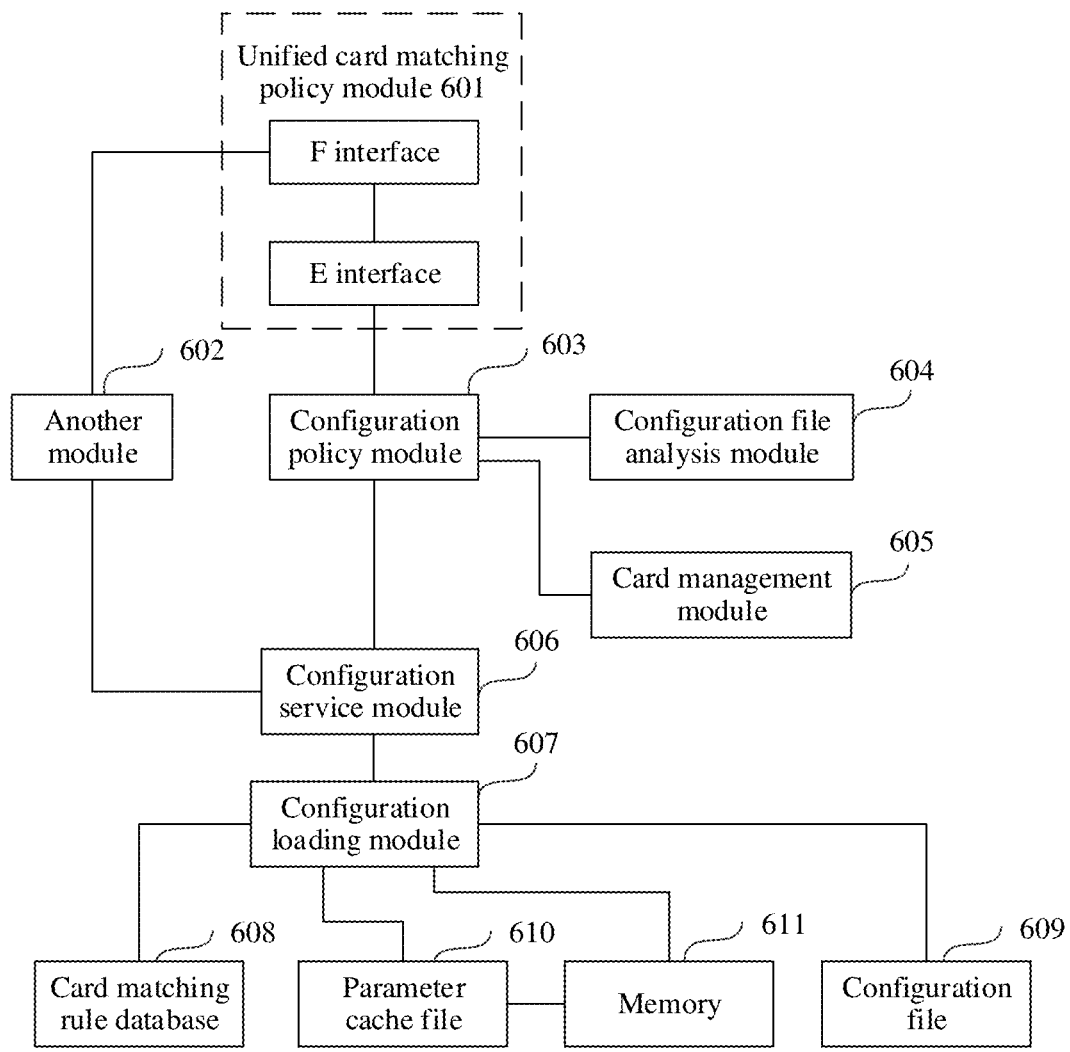
FIG. 6 is a schematic diagram of a logical architecture of another terminal configuration method according to an embodiment of this application.

For example, the foregoing method may be implemented by using a software logical architecture shown in FIG. 6. According to FIG. 6, a unified card matching policy module 601 (for example, named CfgFilePolicy) is configured to provide an E interface and an F interface configured to obtain, from another module 602 (for example, a module configured to store code), code (for example, java) and a file (for example, an XML file storing a first mapping relationship and a second mapping relationship) that are required for performing the foregoing method, where the F interface may be configured to communicate with the another module 602, and the E interface may be configured to communicate with another module that expects to obtain code; a configuration policy module (for example, named CarrierConfigPolicy) 603 is configured to implement the E interface and the F interface and implement exchange of SIM card information; a configuration file analysis module (for example, named CarrierConfigXmlParse) 604 may be configured to analyze and parse a complex type file in a code file; a card management module (for example, named CarrierConfigCardManager) 605 may be configured to provide SIM card information to facilitate loading of the card information, for example, obtain an IMSI, an SPN, a GID, and other SIM card information from a SIM card, and send the SIM card information to the configuration policy module 603; a configuration service module (for example, named CarrierConfigService) 606 may be configured to provide a service for the another module shown in FIG. 6, and may be configured to send an operator parameter to the another module 602, so that the another module 602 updates the operator parameter; and a configuration loading module (for example, named CarrierConfigLoader) 606 may be configured to provide data parsing and storage services for the another module shown in FIG. 6.

During implementation, the configuration service module 606 may obtain code, a related file, and the SIM card information from the configuration policy module 603, and then send the code, the related file, and the SIM card information to the configuration loading module 607. The configuration loading module 607 may execute the code, and determine the operator parameter based on the SIM card information. Specifically, the configuration loading module 607 may determine the first mapping relationship and the second mapping relationship based on the related file, and store the first mapping relationship and the second mapping relationship in a card matching rule database 608. When determining the operator parameter, the configuration loading module 607 may read the first mapping relationship and the second mapping relationship from the card matching rule database 608, and determine an identifier of the operator parameter based on the IMSI in the SIM card information and the first mapping relationship, or determine, based on the second mapping relationship, an identifier of the operator parameter corresponding to the IMSI and the SPN/GID in the SIM card information. The configuration loading module 607 may further parse, based on a configuration file 609, an operator parameter file associated with the identifier of the operator parameter, to obtain the operator parameter. The configuration loading module 607 may further send the obtained operator parameter to the another module 602, so that the another module 602 updates the operator parameter. The configuration loading module 607 may further configure a parameter cache file 610 based on the obtained operator parameter, where the parameter cache file 610 may be used to update a current operator parameter in a memory 611. The configuration loading module 607 may further read the current operator parameter in the memory 611.

Based on a same technical concept, an embodiment of this application further provides a terminal, configured to implement the method performed by the UE 101 in the foregoing method embodiments.

Figure 7:
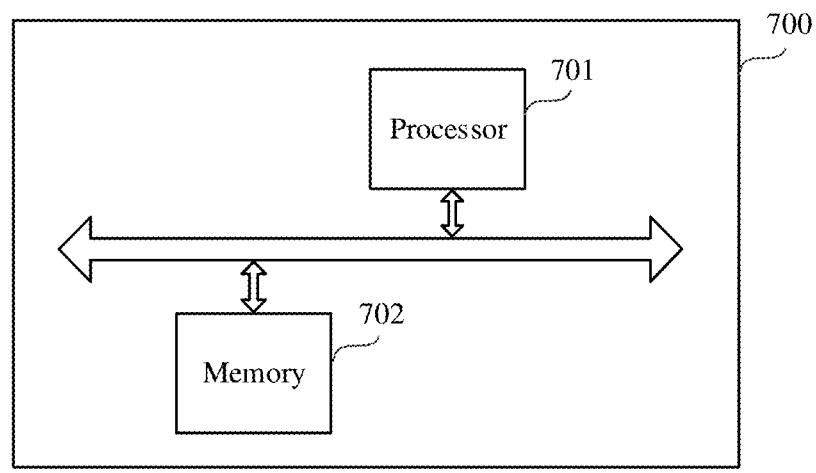
FIG. 7 is a schematic structural diagram of a terminal according to an embodiment of this application.

FIG. 7 is an example of a schematic structural diagram of a terminal according to this application. As shown in FIG. 7, the terminal 700 includes one or more processors 701 and a memory 702. The processor 701 may include some or all of an application processor, a wireless communications module, or a wireless interface module. The application processor may be configured to perform a function of the application processor 203 in the UE 101 shown in FIG. 2. The wireless communications module may have a function of the wireless communications module 202 in the UE 101 shown in FIG. 2. The wireless interface module may have a function of the RIL in the present disclosure. For example, the processor 701 and the memory 702 may be connected to each other by using a bus structure.

The processor 701 may be a central processing unit (CPU), a network processor (NP), or a combination of a CPU and an NP. The processor 701 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 702 is configured to store one or more software instructions and data, where the data may include frequency information. The processor 701 can perform one or more steps in the foregoing method embodiments or an optional implementation in the foregoing method embodiments by invoking the stored program instruction(s). Optionally, the processor 701 and the memory 702 may be integrated together.

In an example embodiment, the processor 701 may be configured to read the software instructions in the memory 702 to implement the following operations: when determining that a subscriber identity module (SIM) card in the terminal is powered on, the wireless communications module reads first information in the SIM card from the SIM card, and sends the first information to the application processor, where the first information includes some or all of an international mobile subscriber identity (IMSI), a service provider name (SPN), or a global identifier ID (GID); and the application processor obtains an operator parameter based on the first information, where the operator parameter is used by the terminal to access a network of the operator by using the SIM card.

In an example embodiment, the processor 701 may further be configured to:
use the application processor to send information about the operator parameter to the wireless communications module;
use the wireless communications module to determine the operator parameter based on the information about the operator parameter; and
use the wireless communications module to load the operator parameter.

In an example embodiment, if the first information includes the IMSI, when the application processor obtains the operator parameter based on the first information, the processor 701 may be further configured to:
use the application processor to determine, based on a first mapping relationship, the operator parameter corresponding to the IMSI, where the first mapping relationship is a mapping relationship between the IMSI and the operator parameter.

In an example embodiment, if the first information includes the IMSI and second information, when the application processor obtains the operator parameter based on the IMSI, the processor 701 may be further configured to:
use the application processor to determine, based on a second mapping relationship, the operator parameter that is corresponding to the IMSI and the second information, where the second mapping relationship is a mapping relationship between the IMSI, the second information, and the operator parameter, and the second information includes the SPN and/or the GID.

In an example embodiment, the processor 701 further includes a wireless interface module, and when the application processor obtains the first information, the processor 701 may further be configured to:
use the wireless communications module to send the first information to the wireless interface module, and
use the wireless interface module to send the first information to the application processor.

A person skilled in the art may understand that, for ease of description, FIG. 7 shows only one memory and only one processor. In an actual terminal, there may alternatively be a plurality of processors and a plurality of memories. The memory may also be referred to as a storage medium, a storage device, or the like. This is not limited in embodiments of this application.

For example, the processor 701 shown in FIG. 7 may have functions of some or all of the unified card matching policy module 601, the configuration policy module 603, the configuration file analysis module 604, the card management module 605, the configuration service module 606, the configuration loading module 607, the card matching rule database 608, the parameter cache file 610, the memory 611, and the configuration file 609 that are in the architecture shown in FIG. 6.

Figure 8:
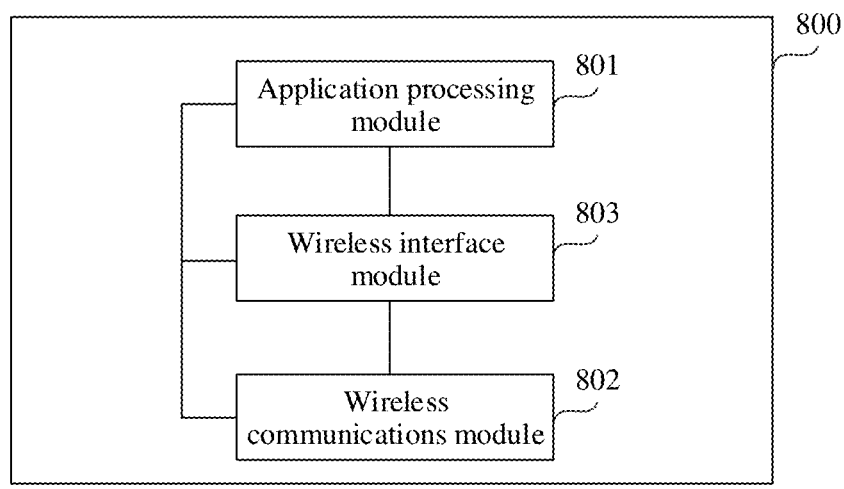
FIG. 8 is a schematic structural diagram of another terminal according to an embodiment of this application.

Based on the foregoing content and a same concept, this application provides a terminal 800, configured to perform the foregoing methods. FIG. 8 is an example of a schematic structural diagram of the terminal 800 according to this application. As shown in FIG. 8, the terminal 800 includes an application processing module 801, a wireless communications module 802, and a wireless interface module 803. Specifically, the wireless communications module 802 may include a modem.

The application processing module 801 may be configured to have a function of the application processor 203 in the foregoing method embodiments. Specifically, the application processing module 801 may be configured to perform steps S103, S204, and S205. The wireless communications module 802 may be configured to have a function of the wireless communications module 202 in the foregoing method embodiments, for example, performing steps S101, S102, S201, S202, S208, and S301 to S308. The wireless interface module 803 may be configured to have a function of an RIL. Specifically, the wireless interface module 803 may be configured to perform steps S202 and S207. When the application processing module 801 sends a message to the wireless communications module 802, the wireless interface module 803 may further receive and buffer the message sent by the application processing module 801, and send the message to the wireless communications module 802; or when the wireless communications module 802 sends a message to the application processing module 801, the wireless interface module 803 may further receive and buffer the message sent by the wireless communications module 802, and send the message to the application processing module 801.

It should be understood that division of the foregoing modules of the terminal 800 is merely logical function division. In actual implementation, all or some of the modules may be integrated into one physical entity, or the modules may be physically separated. In this embodiment, the application processing module 801, the wireless communications module 802, and the wireless interface module 803 in FIG. 8 may be implemented by the processor 701 in FIG. 7. In other words, in this embodiment, the application processing module 801, the wireless communications module 802, and the wireless interface module 803 may perform the solution performed by the processor 701 in FIG. 7. For other content, refer to the foregoing content, and details are not repeated.

For example, the application processing module 801 shown in FIG. 8 may have functions of some or all of the unified card matching policy module 601, the configuration policy module 603, the configuration file analysis module 604, the card management module 605, the configuration service module 606, the configuration loading module 607, the card matching rule database 608, the parameter cache file 610, the memory 611, and the configuration file 609 that are in the architecture shown in FIG. 6.

All or some of the foregoing embodiments may be implemented by means of software, hardware (for example, circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The embodiments of the present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to embodiments of the present invention without departing from the spirit and scope of this application. This application is intended to cover these modifications and variations provided that they fall within the scope of protection defined by the following claims and their equivalent technologies.

The invention claimed is:

1. A communication method, performed by a terminal including an application processor and a wireless communications module comprising:
   determining whether a subscriber identity module (SIM) card in the terminal is powered on;
   upon determining that the SIM card in the terminal is powered on, reading, by the wireless communications module, first information in the SIM card from the SIM card;
   sending, by the wireless communications module, the first information to the application processor; and
   obtaining, by the application processor based on the first information, an operator parameter, wherein the terminal uses the operator parameter to access a network of the operator by using the SIM card; and
   the first information comprises one or more of an international mobile subscriber identity (IMSI), a service provider name (SPN), or a global identifier (GID),
   wherein the reading of the first information from the SIM card by the wireless communications module is triggered by the determination of the SIM card being powered on and is performed at a moment at which the SIM card is determined to be powered on.

2. The method according to claim 1, further comprising:
   sending, by the application processor, information about the operator parameter to the wireless communications module;
   determining, by the wireless communications module, an operator parameter based on the received information about the operator parameter; and
   loading, by the wireless communications module, the determined operator parameter.

3. The method according to claim 2, further comprising: before the loading, by the wireless communications module, the determined operator parameter,
   performing, by the wireless communications module, a pre-loading process.

4. The method according to claim 3, wherein the pre-loading process comprises:
   receiving a first command through an attention (AT) command channel, wherein the first command includes the information about the operator parameter; and
   locking the AT command channel, and buffering an AT command sent by the application processor, and
   the method further comprises unlocking the AT command channel after loading the operator parameter.

5. The method according to claim 1, wherein the obtaining, by the application processor based on the first information, an operator parameter comprises:
   upon determination that the first information comprises the IMSI, determining, by the application processor based on a first mapping relationship, the operator parameter corresponding to the IMSI, wherein the first mapping relationship is a mapping relationship between the IMSI and the operator parameter.

6. The method according to claim 1, wherein the obtaining, by the application processor based on the first information, an operator parameter comprises:
   upon determination that the first information comprises the IMSI and second information, determining, by the application processor based on a second mapping relationship, the operator parameter that is corresponding to the IMSI and the second information, wherein the second mapping relationship is a mapping relationship between the IMSI, the second information, and the operator parameter; and
   the second information comprises the SPN and/or the GID.

7. The method according to claim 1, wherein the terminal further comprises a wireless interface; and
   the sending, by the wireless communications module, the first information to the application processor comprises:
   sending, by the wireless communications module, the first information to the wireless interface; and
   sending, by the wireless interface, the first information to the application processor.

8. The method according to claim 1, wherein the sending, by the wireless communications module, the first information to the application processor comprises:
   sending, by the wireless communications module, the first information to the application processor through a first channel, wherein the first channel is a dedicated transmission channel for sending the first information.

9. A terminal, comprising at least one processor and a memory, wherein the at least one processor comprises an application processor and a wireless transceiver;

the memory is configured to store one or more program instructions and data; and the at least one processor is configured to:

determine whether a subscriber identity module (SIM) card in the terminal is powered on;

upon determining that the SIM card in the terminal is powered on, read, by the wireless transceiver, first information from the SIM card;

send, by the wireless transceiver, the first information to the application processor; and obtain, by the application processor based on the first information, an operator parameter, wherein the terminal uses the operator parameter to access a network of the operator by using the SIM card; and the first information comprises some or all of an international mobile subscriber identity (IMSI), a service provider name (SPN), or a global identifier (GID), wherein the reading of the first information from the SIM card is triggered by the determination of the SIM card being powered on and is performed at a moment at which the SIM card is determined to be powered on.

10. The terminal according to claim 9, wherein the at least one processor is further configured to:

send, by the application processor, information about the operator parameter to the wireless transceiver;

determine, by the wireless transceiver, an operator parameter based on the information about the operator parameter; and load, by the wireless transceiver, the determined operator parameter.

11. The terminal according to claim 10, wherein the at least processor is further configured to:

before the wireless transceiver loads the operator parameter, perform a pre-loading process by the wireless transceiver.

12. The terminal according to claim 9, wherein the at least one processor is further configured to:

upon determination that the first information comprises the IMSI and the application processor obtains the operator parameter based on the IMSI, determine, by the application processor, based on a first mapping relationship, the operator parameter corresponding to the IMSI, wherein the first mapping relationship is a mapping relationship between the IMSI and the operator parameter.

13. The terminal according to claim 9, wherein the at least one processor is further configured to:

upon determination that the first information comprises the IMSI and second information and the application processor obtains the operator parameter based on the first information, determine, by the application processor, based on a second mapping relationship, the operator parameter that is corresponding to the IMSI and the second information, wherein the second mapping relationship is a mapping relationship between the IMSI, the second information, and the operator parameter; and the second information comprises the SPN and/or the GID.

14. The terminal according to claim 9, wherein the terminal further comprises a wireless interface; and the at least one processor is further configured to:

upon determination that the wireless transceiver sends the first information to the application processor, send, by the wireless transceiver, the first information to the wireless interface; and use the wireless interface to send the first information to the application processor.

15. The terminal according to claim 9, wherein the at least one processor is further configured to:

upon determination that the wireless transceiver sends the first information to the application processor, send, by the wireless transceiver, the first information to the application processor through a first channel, wherein the first channel is a dedicated transmission channel for sending the first information.

16. A non-transitory computer-readable medium, comprising program instructions, that when executed by at least one processor of a terminal, cause the terminal to perform operations comprising:

determining whether a subscriber identity module (SIM) card in the terminal is powered on;

upon determining that the SIM card in the terminal is powered on, reading, by a wireless communications module, first information from the SIM card;

sending, by the wireless communications module, the first information to an application processor; and obtaining, by the application processor based on the first information, an operator parameter, wherein the terminal uses the operator parameter to access a network of the operator by using the SIM card; and the first information comprises some or all of an international mobile subscriber identity (IMSI), a service provider name (SPN), or a global identifier (GID), wherein the reading of the first information from the SIM card is triggered by the determination of the SIM card being powered on and is performed at a moment at which the SIM card is determined to be powered on.

17. The non-transitory computer-readable medium according to claim 16, wherein the operations further comprise:

sending, by the application processor, information about the operator parameter to the wireless communications module;

determining, by the wireless communications module, an operator parameter based on the information about the operator parameter; and loading, by the wireless communications module, the determined operator parameter.

18. The non-transitory computer-readable medium according to claim 17, wherein the operations further comprise:

performing, by the wireless communications module, a pre-loading process.

19. The non-transitory computer-readable medium according to claim 16, wherein the obtaining, by the application processor based on the first information, an operator parameter comprises:

upon determination that the first information comprises the IMSI, determining, by the application processor based on a first mapping relationship, the operator parameter corresponding to the IMSI, wherein the first mapping relationship is a mapping relationship between the IMSI and the operator parameter.

20. The non-transitory computer-readable medium according to claim 16, wherein the obtaining, by the application processor based on the first information, an operator parameter comprises:

upon determination that the first information comprises the IMSI and second information, determining, by the application processor based on a second mapping relationship, the operator parameter that is corresponding to the IMSI and the second information, wherein the second mapping relationship is a mapping relationship between the IMSI, the second information, and the operator parameter; and the second information comprises the SPN and/or the GID.

* * * * *